(12) United States Patent
Windbacher et al.

(10) Patent No.: US 10,358,322 B2
(45) Date of Patent: Jul. 23, 2019

(54) LOAD WEIGHING AT THE LIFTING HOOK

(71) Applicant: Liebherr-Werk Ehingen GmbH, Ehingen (DE)

(72) Inventors: Stefan Windbacher, Ulm (DE); Julian Wehrstedt, Ulm (DE)

(73) Assignee: Liebherr-Werk Ehingen GmbH, Ehingen (DE)

( * ) Notice: Subject to any disclaimer, the term of this patent is extended or adjusted under 35 U.S.C. 154(b) by 93 days.

(21) Appl. No.: 15/630,179

(22) Filed: Jun. 22, 2017

(65) Prior Publication Data

US 2017/0369286 A1 Dec. 28, 2017

(30) Foreign Application Priority Data

Jun. 23, 2016 (DE) .................. 10 2016 007 723

(51) Int. Cl.
| | | |
|---|---|---|
| *G01G 19/14* | (2006.01) | |
| *B66C 1/40* | (2006.01) | |
| *B66C 13/16* | (2006.01) | |
| *B66C 23/66* | (2006.01) | |

(52) U.S. Cl.
CPC ............... *B66C 1/40* (2013.01); *B66C 13/16* (2013.01); *B66C 23/66* (2013.01); *G01G 19/14* (2013.01)

(58) Field of Classification Search
CPC ........... B66C 13/16; B66C 23/66; B66C 1/40; G01G 19/14; G01G 19/16; G01G 19/18; G01G 23/005
See application file for complete search history.

(56) References Cited

U.S. PATENT DOCUMENTS

| | | | | |
|---|---|---|---|---|
| 1,795,405 | A * | 3/1931 | Archibald ............... | B66C 23/90 116/303 |
| 2,310,597 | A | 2/1943 | Raphael | |
| 3,517,761 | A * | 6/1970 | Wigman .................. | B66C 1/40 177/147 |
| 3,679,012 | A * | 7/1972 | Haulotte .................. | B66D 3/04 177/147 |
| 3,771,668 | A * | 11/1973 | Johnston ................ | B66C 13/16 212/264 |
| 3,827,514 | A * | 8/1974 | Bradley .................... | B66C 1/40 177/147 |
| 4,112,750 | A * | 9/1978 | Murakami ................ | B66C 1/40 177/147 |
| 4,503,921 | A * | 3/1985 | Polen ..................... | G01G 19/18 177/147 |
| 4,815,549 | A * | 3/1989 | Gealt ........................ | G01G 3/02 177/234 |
| 7,823,466 | B2 * | 11/2010 | Glass ...................... | G01L 5/103 73/826 |
| 2008/0087475 | A1 | 4/2008 | Petrucelli | |

FOREIGN PATENT DOCUMENTS

| | | |
|---|---|---|
| DE | 21 21 814 A | 11/1971 |
| DE | 22 08 207 A | 8/1973 |
| DE | 23 37 998 A1 | 2/1975 |
| GB | 2 059 082 A | 4/1981 |

* cited by examiner

*Primary Examiner* — Randy W Gibson
(74) *Attorney, Agent, or Firm* — Dilworth & Barrese, LLP (57) ABSTRACT

The invention relates to an apparatus for weighing the hook load of a crane, wherein different measurement accuracies can be set at the apparatus, comprising at least one measurement device, at least one retaining pin, and at least one coupling section. The invention is additionally directed to a hook block and to a crane having a corresponding apparatus.

9 Claims, 9 Drawing Sheets

LOAD WEIGHING AT THE LIFTING HOOK

BACKGROUND OF THE INVENTION

The invention relates to an apparatus for weighing the hook load of a crane, wherein different measurement accuracies can be set at the apparatus, comprising at least one measurement device, at least one retaining pin, and at least one coupling section, wherein the apparatus is provided between a boom and the hook of a crane, wherein the retaining pin and/or the measurement device can be positioned at at least two different positions at the coupling section, and wherein the positions are in particular horizontally spaced apart from one another.

It is prior art with cranes, and in particular with lattice mast cranes, to carry out the load weighing, that is the weighing of the weight of a load attached to the crane hook or hook load, via the measurement of the guying forces in the guying of the corresponding crane. The weight of the hook load is then calculated from the determined guying forces while taking account of the known boom geometry or crane geometry. It is furthermore known with telescopic cranes to detect the forces occurring in the luffing ram and likewise to calculate the load at the hook via the known geometry of the telescopic crane. Systems are furthermore known that e.g. determine the forces occurring at the cable lines of the crane e.g. by means of a load cell and that measure the load applied to the hook while taking account of the reeving of the crane.

It is problematic with the apparatus known from the prior art that the load measurement is carried out with the same apparatus independently of whether particularly large or particularly small weights or loads are just attached to the crane. It can occur in this process that the sensor used in the apparatus is used for determining a large range of weights, with said sensor not having sufficient measurement accuracy for both large weights and small weights simultaneously. This is linked to the fact that known measurement sensors typically only have a limited measurement range and can correspondingly deliver less accurate values on the exceeding thereof.

SUMMARY OF THE INVENTION

Against the background of these problems, it is the object of the invention to provide an apparatus for weighing the hook load by means of which sufficiently exact weight measurements can be carried out over a large weight range.

This object is achieved in accordance with the invention by an apparatus having the features herein, wherein different measurement accuracies can be set at the apparatus for weighing the hook load, comprising at least one measurement device, at least one retaining pin, and at least one coupling section, wherein the apparatus is provided between a boom and the hook of a crane, wherein the retaining pin and/or the measurement device can be positioned at at least two different positions at the coupling section, and wherein the positions are in particular horizontally spaced apart from one another. The positions can alternatively or additionally be vertically spaced apart from one another. A vertical or slanted arrangement of the positions with respect to one another is thus conceivable. What is important is that the forces transmitted by the retaining pin in the two positions can be differently divided via corresponding lever relationships.

The retaining pin and/or the measurement device can in this respect be positioned either at the one position or at the other position. The lever relationship at the apparatus can be changed by the repositioning of the retaining pin and/or of the measurement device such that the measurement range of the measuring device, that is fixed per se, can be adapted to the measurement force or to the currently applied load weight. A more exact load weighing can hereby be reached, whereby the actual load of the crane can be exactly determined and the maximum permitted payload can thereby be better utilized. The measurement device can in this respect be present separate from or combined with the retaining pin so that the retaining pin can be called a measurement pin. In this respect, the measurement device can be provided in the retaining pin.

The measurement device can be integrated in or coupled with the associated counter-connection elements to the retaining pin, in particular in the coupling section. If the counter-connection elements to the retaining pin are designed as passages in the coupling section, the measurement devices can be provided at the coupling section in the region of these passages. If the coupling section is designed as a metal sheet receiving the retaining pin, a measurement tab can accordingly be provided or installed therein. The measurement tab or the measurement device then has to be disposed correspondingly in the power flow of the hook block. The measurement device detects or measures tensile forces and/or compressive forces.

Advantageous embodiments are the subject of the dependent claims. Provision can accordingly be made that the retaining pin and/or the measurement device is/are continuously adjustable between at least two positions. The measurement accuracy of the measurement device can hereby also be correspondingly continuously varied and can be flexibly set to different weight ranges of the hook load. The adjustment can in this respect take place, for example, via screws, cylinders or similar. The two positions can in this respect be limit positions between which further positions can be present for positioning the retaining pin at which different lever relationships are present at the apparatus and thus an exact load weighing can be accordingly carried out in different load ranges using the same measurement device.

It is conceivable in a further preferred embodiment that at least two measurement devices are present that are positioned asymmetrically at the coupling section. The asymmetry can in this respect relate to the arrangement of the measurement devices relative to a plane in which the hook load acts on the hook. More details on the asymmetrical arrangement of the measurement devices results from the description of the Figures. A possible slanted position of a hook block of the crane can be determined due the asymmetrical arrangement of the measurement devices at a coupling section coupled to the hook block instead of by means of an angle transmitter from the uneven load distribution at the two measurement devices. The apparatus in accordance with the invention for moving the hook load can advantageously thus be simultaneously used for monitoring the alignment of the hook block.

It is conceivable in a further preferred embodiment that the measurement device and the retaining pin transmit the load of the hook at least partially to the crane. Provision can in particular be made that the total hook load is correspondingly transmitted via the measurement device and the retaining pin. In this respect, the measurement device and the retaining pin can be force-transmitting components of a hook block of the crane, whereby advantageously no additional components or only a few additional components are required for carrying out the invention. Provision can thus be made in a further preferred embodiment that the apparatus is provided at a hook block and/or is coupled to the boom of the crane, in particular to the roller set of the boom head. Alternatively or simultaneously, the apparatus can thus be configured as a part of the hook block and/or as part of the boom. With an apparatus provided at the hook block, it is particularly easily possible in this respect to retrofit a crane with a corresponding apparatus and to utilize it for monitoring a possible slanted position of a hook block.

It is conceivable in a further preferred embodiment that the measurement device is secured against overload, in particular by using at least one pin. If a measurement sleeve of the measurement device can in this respect not take over the force introduced into it in case of overload, the additional pin secures the measurement device and can correspondingly take up or secure force peaks. Provision can also be made that all the pins or retaining pins and measurement sleeves or measurement devices used in accordance with the invention are coupled to one another. Additionally or alternatively, the measurement devices can be provided at the counter-connection elements or in the regions of the counter-connection elements of the pins or retaining pins, in particular in the region of the coupling section.

It is furthermore conceivable in a further preferred embodiment that an energy supply is provided at the apparatus. This can be independent of or dependent on the energy supply of the crane and is described in more detail in the embodiment of the Figures.

Provision can furthermore be made in a further preferred embodiment that the apparatus for the cable-less transmission of measurement signals is arranged between the measurement device and a control unit. The control unit can in this respect be provided in or at the crane and can also comprise a display for displaying the measurement results. Certain control or regulation algorithms determined in dependence on the measurement signals can be transmitted to drives of the crane by means of the control unit.

The invention also relates to a hook block or to a boom head or to a roller head having at least one apparatus for weighing the hook load and to a crane having the corresponding apparatus.

BRIEF DESCRIPTION OF THE DRAWINGS

Further details and advantages of the invention will be explained with reference to the embodiment shown by way of example in the Figures. There are shown.

DESCRIPTION OF THE PREFERRED EMBODIMENTS

Figure 1:
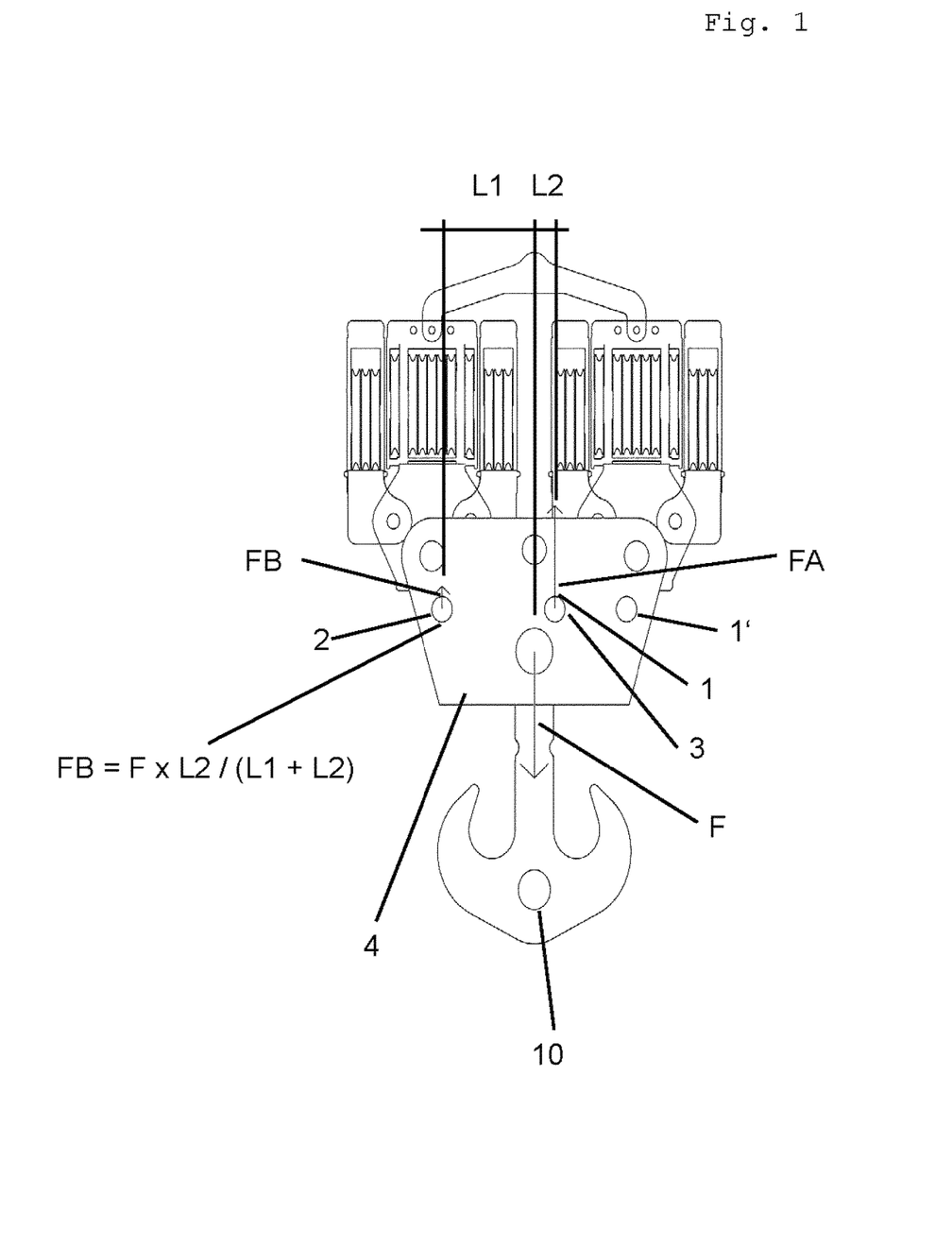
FIG. 1: a hook block with an apparatus in accordance with the invention and with a retaining pin in a first position.

FIG. 1 shows an apparatus in accordance with the invention at a hook block of a crane, wherein a hook 10 is provided in the lower region of the hook block. In this respect, a measurement device 2 and a retaining pin 3 are provided in the coupling section 4. The retaining pin 3 is in this respect located in a first retaining position 1. The apparatus in accordance with FIG. 1 is in this respect configured for load weighing at the hook block with a measurement accuracy that is as high as possible. This is achieved in that the measurement device 2 is, on the one hand, directly attached to the hook block and the measurement is thereby not falsified via, for example, the boom movement or via expansions in the guying and, on the other hand, lever relationships of the components of the apparatus that differ in accordance with the invention and thus the forces occurring at the measurement device 2 can be set to their optimum measurement ranges.

The retaining pin 3 is thus installed in the first retaining position 1 shown in FIG. 1 on the lifting of a large load. A small resulting force $FB=F \times L2/(L1+L2)$ thus results on the measurement device 2 and a large resulting force (FA) on the retaining pin 3. A measurement device 2 having a smaller measurement range and smaller dimensions and costs can hereby be selected. The ratio of the forces FA and FD is, as can be seen from FIG. 1, determined by the horizontal spacings L1, L2 of the retaining pin or of the measurement device 2 from the downwardly acting weight force F of the hook 10 or of the load attached thereto. If two or more measurement devices 2 are used, for example, for an additional angular measurement of the block, these measurement devices 2 can be arranged asymmetrically in the sense that their spacings L1, L2 are of different amounts. In this respect, a second measurement device 2 can be introduced instead of the retaining pin 3 into a corresponding retaining position 1, 1'.

Figure 2:
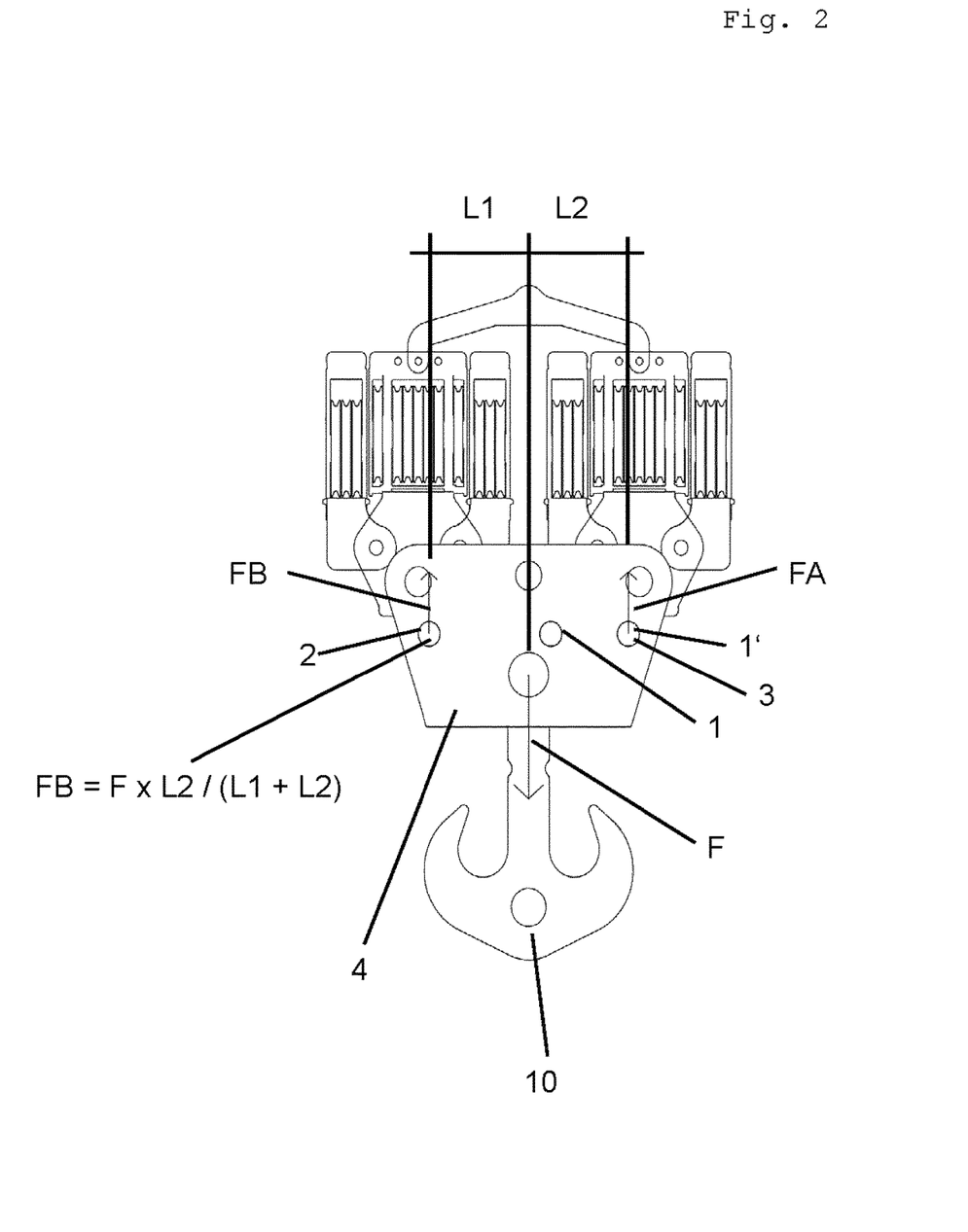
FIG. 2: a hook block with an apparatus in accordance with the invention and with a retaining pin in a second position.

If only a small load is lifted, the retaining pin 3 can be installed in the second retaining position 1' shown in FIG. 2. Due to the changed lever relationships or due to the changed spacings L1, L2, a larger force results in relation to the measurement device 2 and thus as a result a higher measurement accuracy on a use of the same measurement device 2 for measuring small loads.

The energy supply of the apparatus or of the measurement device 2 can take place, for example, via a rechargeable battery, with said rechargeable battery for example being able to be provided in an additional ballast plate at the block. It is alternatively or additionally also conceivable to provide solar cells laterally at the block, for example. They can be used, for example, as a charging apparatus for an energy store that supplies the sensors and, optionally, other units of the apparatus with energy. It is also conceivable that the solar cells are the only power source of the apparatus, in particular when the apparatus is only used as an additional device. If the additional device fails, the load weighing know per se via the guying forces is used.

It is also conceivable that a correspondingly dimensioned wind wheel is provided at the block or at another part of the crane as a charging apparatus for charging an energy store. The wind wheel can again also be provided as the only power source when the apparatus is only used as an additional device. It is additionally or alternatively also conceivable to provide an energy supply of the apparatus within a rope pulley of the hook block, wherein the rotational movement of the rope pulley is used for driving a dynamo during a lifting or lowering procedure. Such a generator can in this respect, as also the previously named energy sources, as a charging apparatus for an energy store and/or as the only power source of the apparatus when the apparatus is only used as an additional device.

The energy supply of the apparatus can furthermore take place via a corresponding power cable that is provided by a crane drive of the crane or by a power source of the crane via its boom to the hook block or to the region of the crane in which the apparatus in accordance with the invention is attached. If the apparatus is in this respect configured as a part of the hook block, the hoist rope of the crane can also serve as a power cable for the energy supply. It is conceivable in a further possible embodiment that a power unit is additionally or alternatively provided at the hook block that supplies the apparatus with electrical energy.

A wireless LAN connection can be provided between the measurement device 2 and the control unit for a data transfer between the measurement device 2 and a control unit that is configured for evaluating the measurement data and for a corresponding control/regulation of the crane. Alternatively or additionally, links via Bluetooth, Zigbee or also via the hoist rope are conceivable. The hoist rope can in this respect be used as a signal conductor between the control unit and the measurement device.

An optical transmission of data between the measurement device and the control unit is also conceivable, with an infrared connection being able to be present, for example, between the components. Provision can furthermore additionally or alternatively be made to provide a data transmission cable between the control unit and the apparatus in accordance with the invention.

Sensors can furthermore be provided in the region of the retaining position 1, 1' that are configured to determine whether there is a retaining pin 3 or not in the respective retaining position. The corresponding data can be transmitted to the control unit of the crane via a data link. The control unit can thus detect the position in which a retaining pin 3 is plugged and can determine the lever relationship present at the apparatus. If a lever relationship for the more exact measurement range is activated by means of the retaining pin 3, with the retaining pin 3 being able to be plugged into retaining positions 1, the maximum payload of the crane can simultaneously be limited by the control unit. If the measurement range for large loads is activated in that the retaining pin 3 is plugged into retaining position 1', the limit is canceled again. The measured value of the measurement pin 2 is converted using the lever factor thus determined in accordance with the equation $$FB=F \times L2/(L1+L2)$$

from which the load F applied to the hook 10 results. The load weighing thus carried out can now be used for improving another used load weighing method that may be present. In this respect, as soon as a rechargeable battery is flat or if the energy supply is interrupted and/or if the radio transmission of the measured values fails or if other disturbances occur, the load weighing can take place solely via the other load weighing method. It is also conceivable also to use the preset load weighing for the primary load weighing, e.g. with a 2-hook operation.

Figure 4:
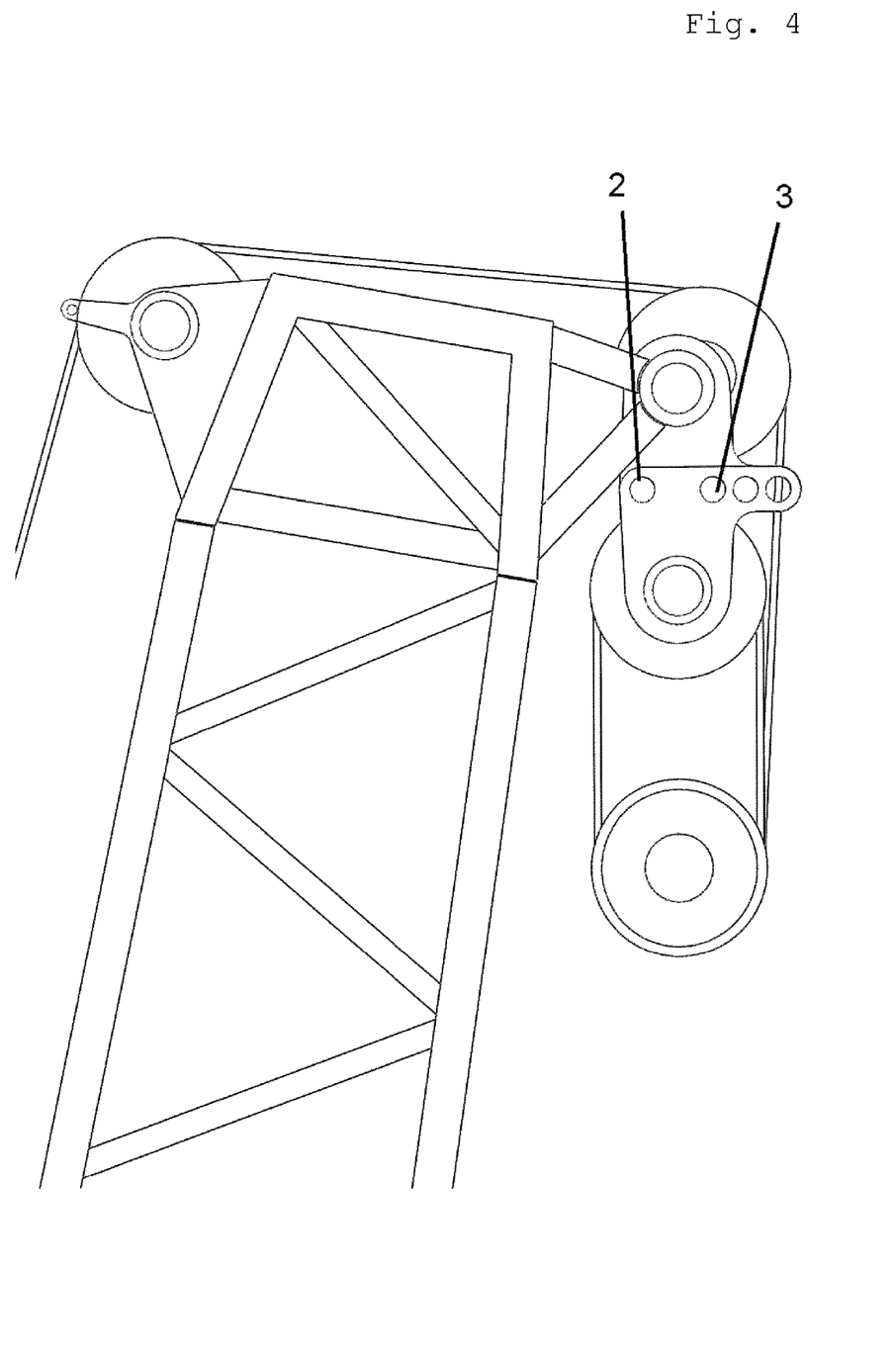
FIG. 4: an apparatus in accordance with the invention at a boom of a crane.

FIG. 4 shows an embodiment in which the apparatus is coupled to the boom of a crane, with the measurement device 2 and the retaining pin 3 here being provided at the roller set of the boom head.

Figure 5A:
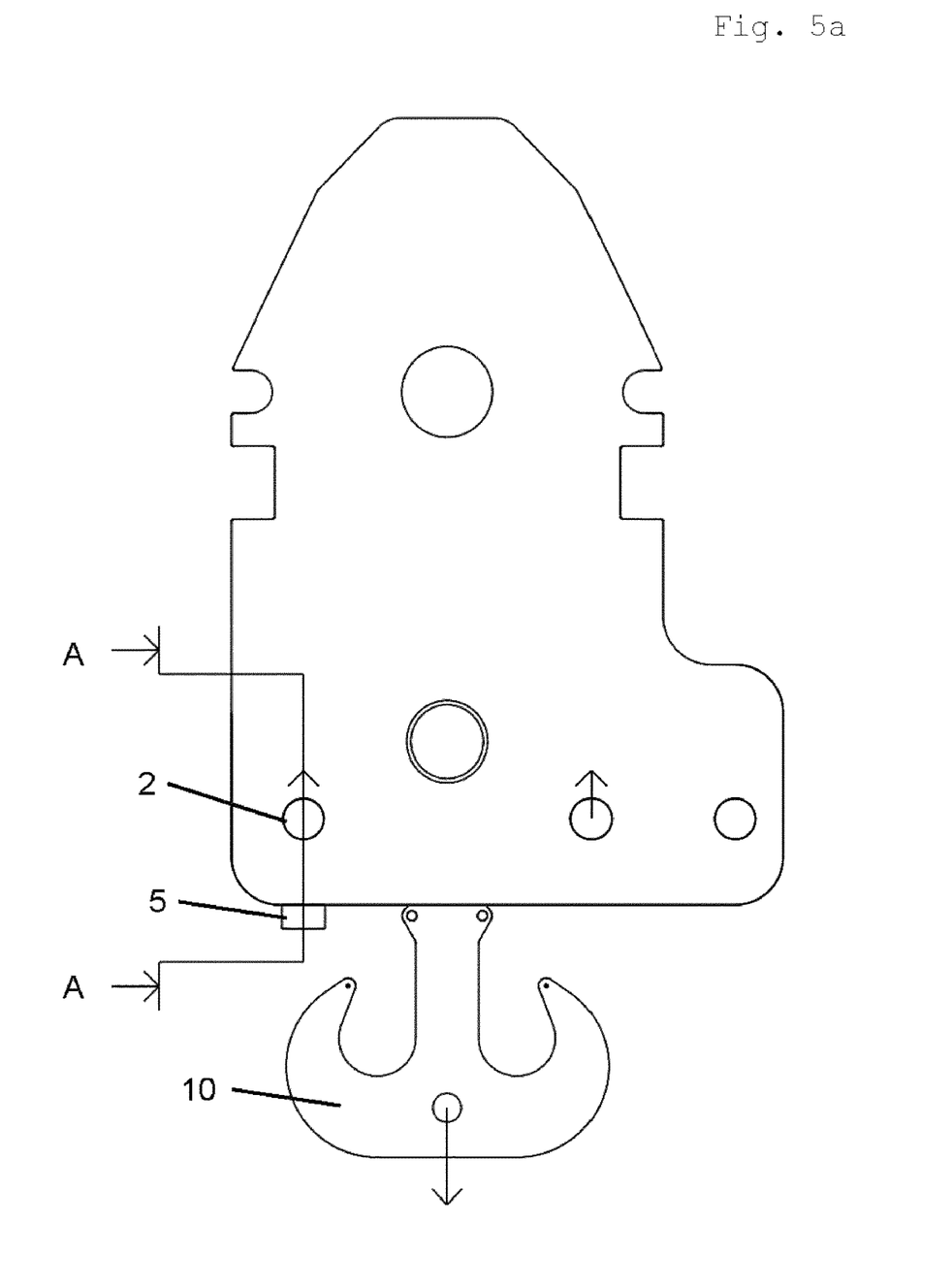
FIGS. 5a-5d: an apparatus in accordance with the invention with a protection region.

As shown in FIG. 5a, the apparatus can comprise a protection region that prevents damage to the apparatus, for example when placing the hook down. In this respect, an elongate hole 6 having an abutment 5 can be provided, with the abutment being able to be provided beneath the measurement device 2. It can be prevented by the abutment 5 that objects penetrate in the region of the measurement device 2 and impair or damage it.

Figure 5B:
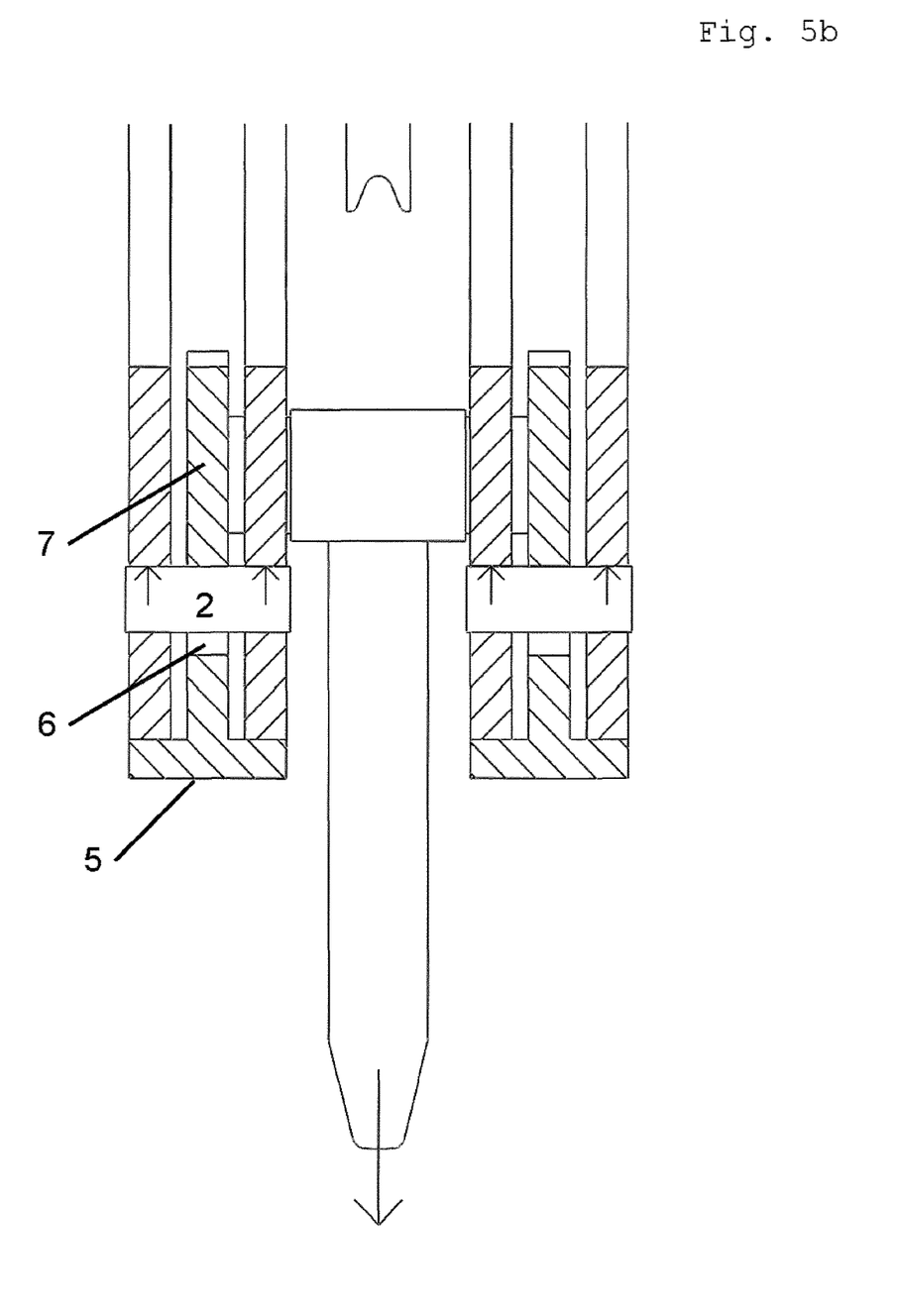

The function of the elongate hole 6 results from FIGS. 5a to 5d. If a force pulls at the hook 10 as in FIG. 5a, a power flow results in the measurement connection 2 or in the measurement device 2, as can be seen in FIG. 5b. The hook 10 is held in the middle metal sheets 7 or metal sheet sections 7. Under load, it pulls the two metal sheets 7 downwardly, with them being held in position via the retaining pin or pins 3 and/or via the measurement device 2.

Figure 5C:
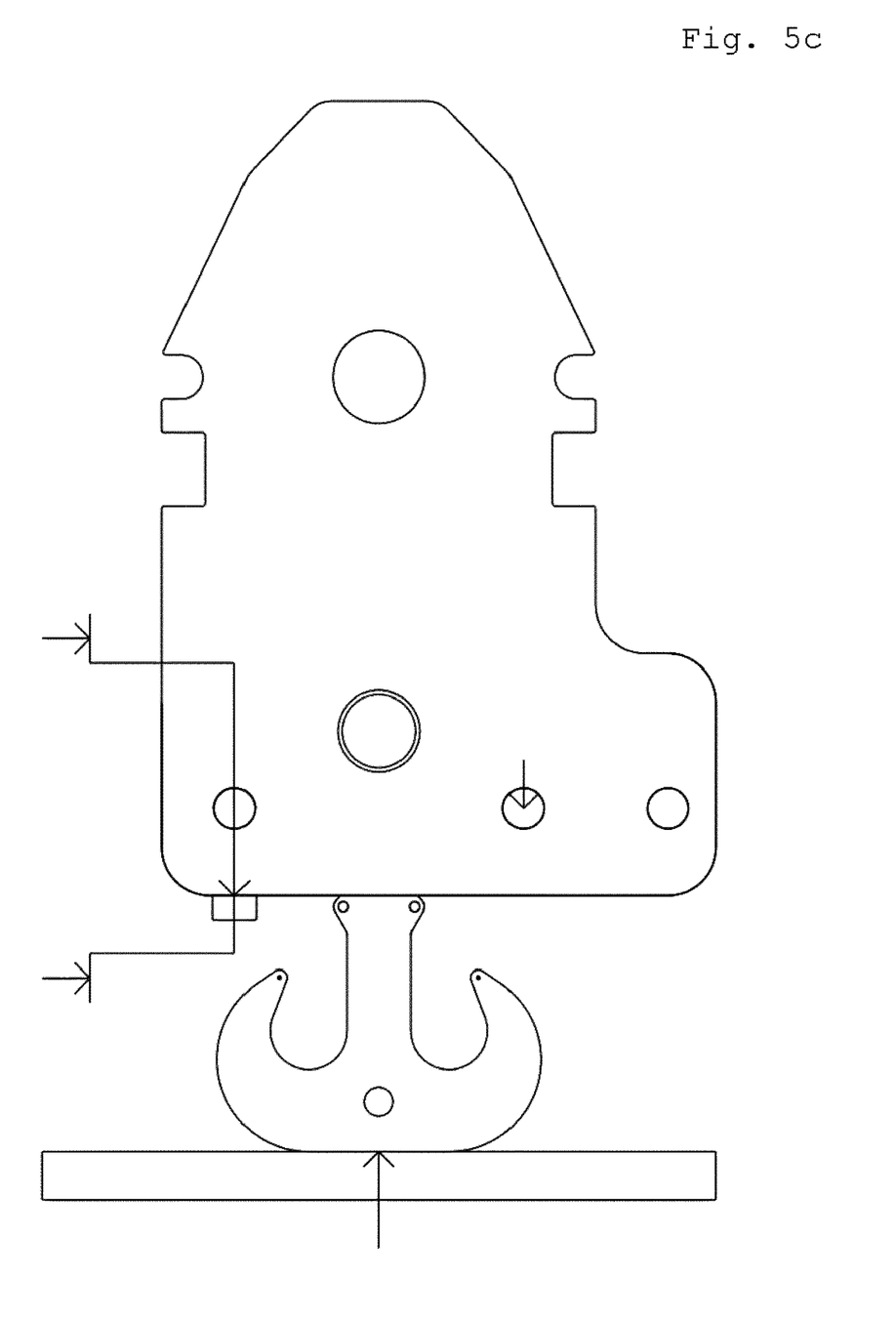
Figure 5D:
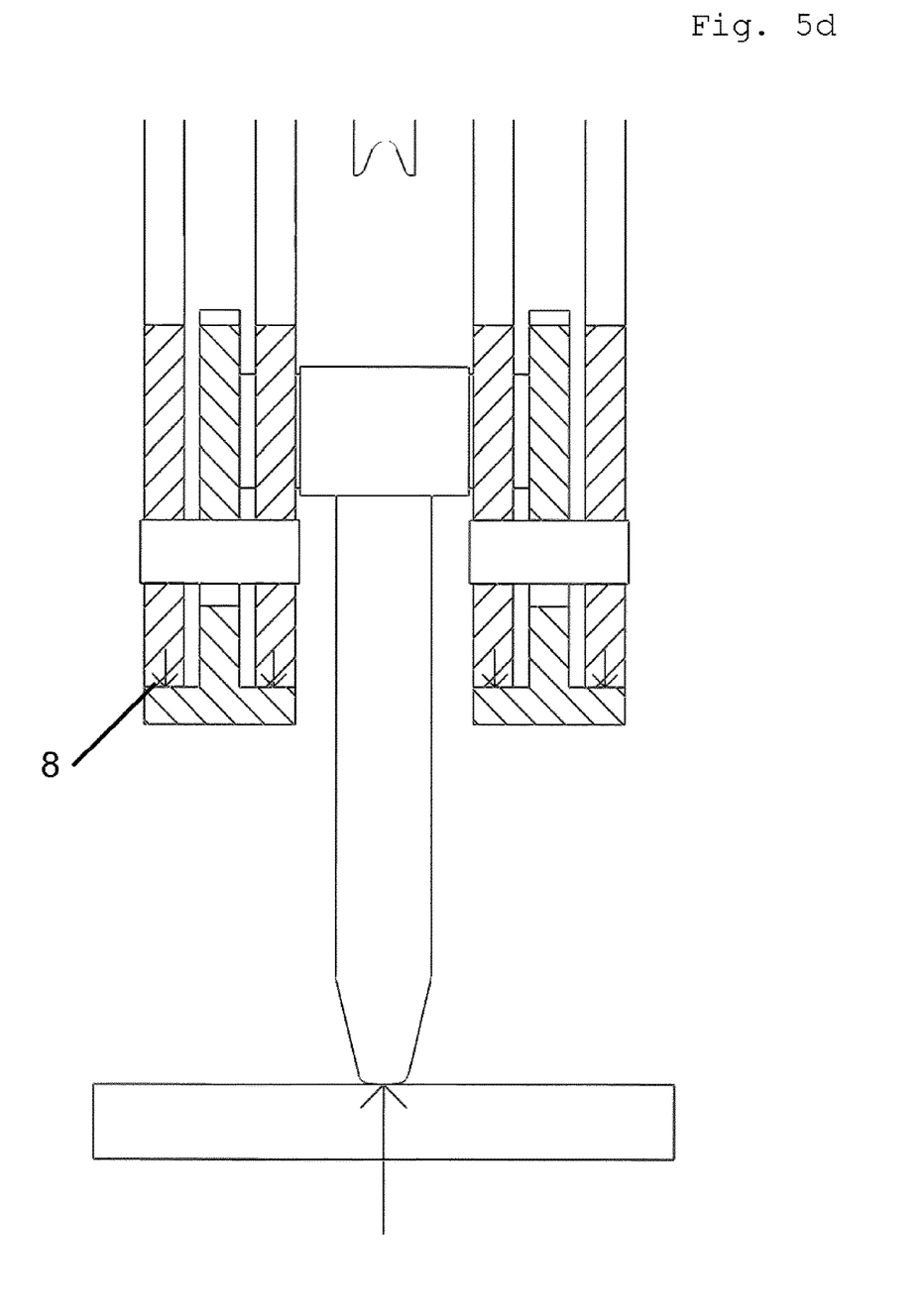

When the hook 10 hits the ground, it experiences a force as shown in FIG. 5c. The forces that occur in the apparatus in this respect are shown in FIG. 5d. The elongate hole 6 allows so much clearance that the front surfaces 8 of the four metal sheets 7 then hold the holder of the hook 10 in position and the measurement device 2 is bridged.

Provision can also be made that an overload protection is provided at the measurement device 2, with the measurement device 2 being able to be configured as the measurement sleeve in which an additional pin is located or which is coupled to an additional pin in another manner that takes up the force acting on the sleeve in a case of overload. Such a combination of a measurement device 2 with a bolt can correspond to the retaining pin 3.

Since the weight of the hook block is part of the load that is lifted by the crane, an unladen weight of the hook block or a weight of the hook block without an additional load weight can be communicated to the control or to the control unit in addition to the value measured by the measurement device 2. This unladen weight can optionally not be measured via the measurement system and is added to the load output by the measurement device 2 as an offset.

The apparatus can also be modified such that additional weights can, for example, be detected at the hook block by the measurement device 2 or by the measurement pin. It must be determined for this purpose whether the same mass or the same additional weight is added at both sides of the hook block.

Figure 3:
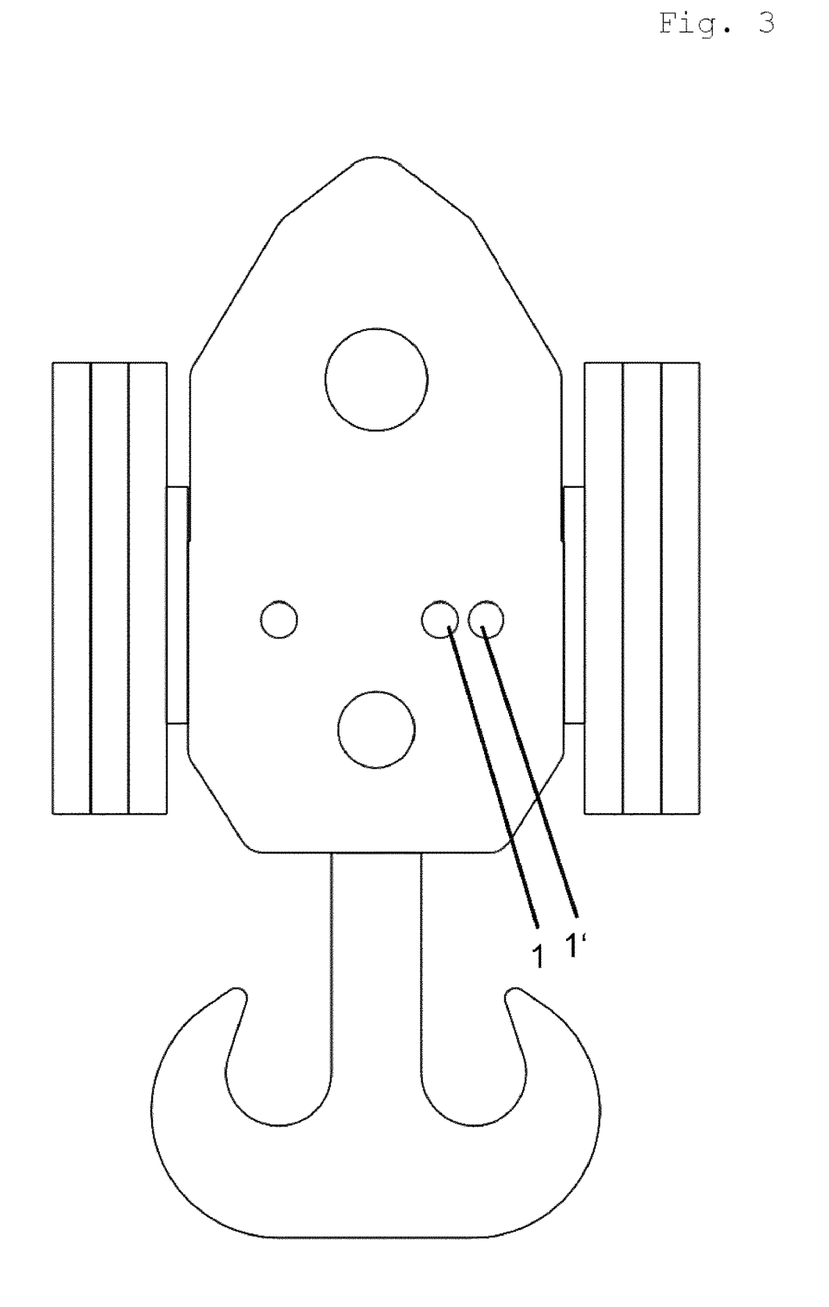
FIG. 3: a hook block in a side view.

This can take place by using two measurement devices 2 or two measurement pins at a respective one side of the hook block, whereby the possibility of failure of the measurement device 2 is also reduced. This is indicated in FIG. 3 where retaining positions 1, 1' are shown in the lateral region of a block.

An angle transmitter can also be provided by means of which it can be recognized whether the hook block is hanging at an incline due to a different weight at different regions of the hook block. If an inclined position is determined, this would result in a shutdown of the crane or an interruption of the crane operation or of the weighing procedure since the measurement accuracy of the measurement device 2 can no longer be observed. After such a shutdown, only the unreeling of the hoist winch would, for example, be permitted, with the hook block being able to be placed on the ground and the additional weights being able to correspondingly balanced.

A transponder apparatus by means of which the additional weights at the hook block can be reported can be also be used to measure the additional weights. The offset weight of the hook block could thus be determined or made known. A switch solution is also conceivable for measuring the additional weights, wherein each additional weight actuates a corresponding switching contact as soon as the additional weight is pinned or connected to the hook block. An input of the additional weight in the crane software is furthermore likewise conceivable, with a crane operator inputting the mass of the equipped hook block or of the additional weight via a keyboard or another interface. The problem, however, exists here of erroneous inputs or of misuse by the operating personnel.

Figure 6:
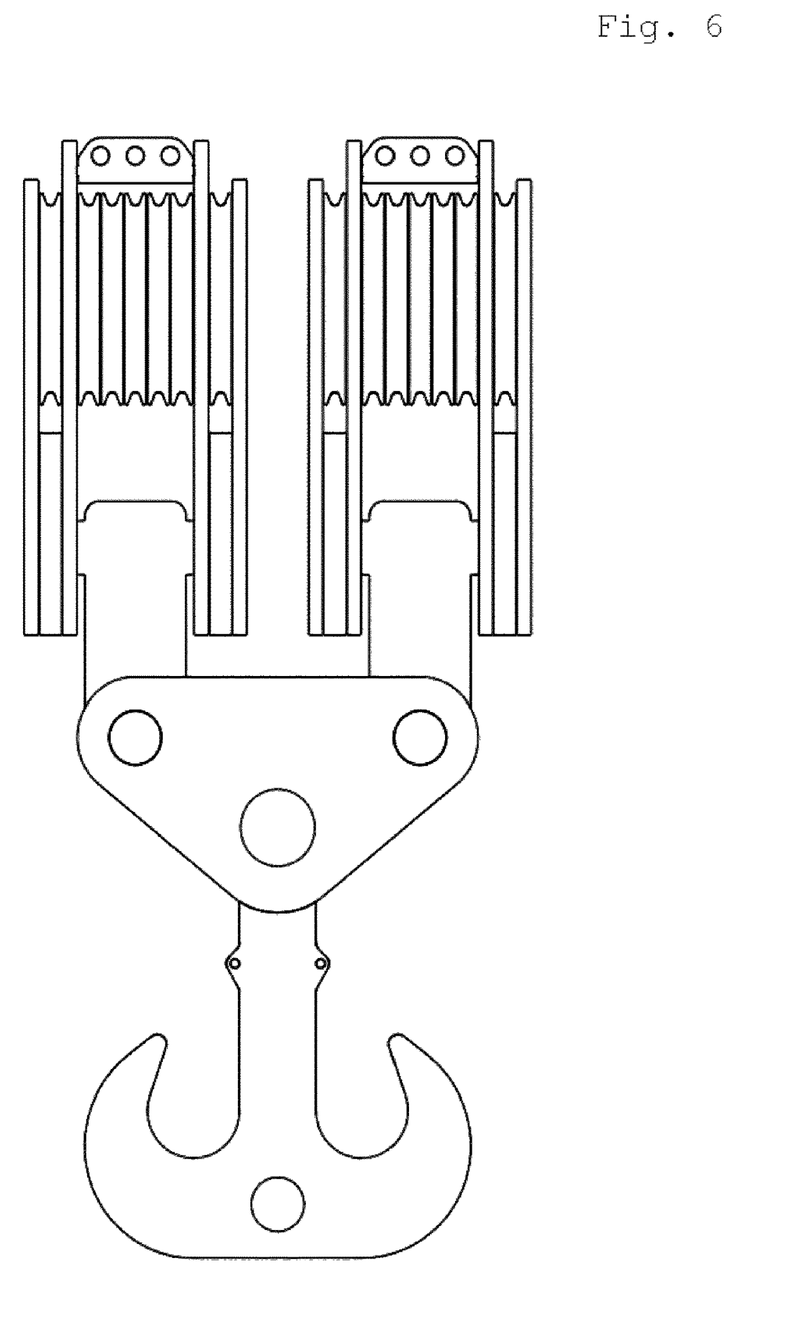
FIG. 6: an apparatus in accordance with the invention with two blocks.

On a use of two blocks having the measurement device in accordance with the invention, as is shown in FIG. 6, they can be coupled to one another and can thus form one single larger hook block. It can be ensured by a corresponding coupling of the control unit or of the individual hook block components that the control unit recognizes that a hook block is now attached to the crane in a large configuration or that a large hook block comprising smaller hook blocks is attached to the crane. The measurement range and the measurement accuracy hereby change accordingly.

If in this respect a hook block is operated with two or more winches, unwanted inclined positions of the hook block can occur. This can take place automatically by means of an angle transmitter. The controller can then directly unreel a winch and thus compensate the inclined position. The angle transmitter can, for example, be connected directly to the hook block control or to the control unit of the crane. Alternatively or additionally, the inclined position can also be determined by means of the hook block having the described measurement device and via an uneven load distribution on the use of two asymmetrically arranged measurement apparatus 2 or measuring pins, such as has been described above.

The invention claimed is:

1. An apparatus for weighing the hook load of a crane, wherein different measurement accuracies can be set at the apparatus, comprising
    at least one measurement device (2), at least one retaining pin (3), and at least one coupling section (4),
    the apparatus is provided between a boom and the hook (1) of a crane,
    the retaining pin (3) and/or the measurement device (2) can be positioned at least at two different positions at the coupling section (4),
    the positions are horizontally spaced apart from one another, and
    the measurement device (2) and the retaining pin (3) transmit the load of the hook (1) at least partially to the crane.

2. An apparatus in accordance with claim 1, wherein the retaining pin (3) and/or the measurement device (2) is/are continuously adjustable between at least two positions.

3. An apparatus for weighing the hook load of a crane, wherein different measurement accuracies can be set at the apparatus, comprising
    at least one measurement device (2), at least one retaining pin (3), and at least one coupling section (4),
    the apparatus is provided between a boom and the hook (1) of a crane,
    the retaining pin (3) and/or the measurement device (2) can be positioned at least at two different positions at the coupling section (4),
    the positions are horizontally spaced apart from one another, and
    at least two measurement devices (2) are provided positioned asymmetrically at the coupling section (4).

4. An apparatus in accordance with claim 1, wherein the apparatus is provided at a hook block and/or coupled to the boom of the crane, to the roller set of the boom head.

5. An apparatus for weighing the hook load of a crane, wherein different measurement accuracies can be set at the apparatus, comprising
    at least one measurement device (2), at least one retaining pin (3), and at least one coupling section (4),
    the apparatus is provided between a boom and the hook (1) of a crane,
    the retaining pin (3) and/or the measurement device (2) can be positioned at least at two different positions at the coupling section (4),
    the positions are horizontally spaced apart from one another, and
    the measurement device (2) is secured against overload by at least one pin.

6. An apparatus in accordance with claim 1, wherein an energy supply is provided at the apparatus.

7. An apparatus in accordance with claim 1, wherein the apparatus is adapted for a cable-less transmission of measurement signals between the measurement device (2) and a control unit.

8. A hook block or a boom head having at least one apparatus for load weighing in accordance with claim 1.

9. A crane having at least one apparatus for load weighing in accordance with claim 1.

* * * * *